United States Patent [19]

Tagami et al.

[11] 4,349,823
[45] Sep. 14, 1982

[54] AUTOMOTIVE RADAR MONITOR SYSTEM

[75] Inventors: Katsutoshi Tagami, Asaka; Takaya Senzaki, Iruma; Nobuhiko Suzuki, Tokyo; Eiji Murao, Asaka, all of Japan

[73] Assignee: Honda Giken Kogyo Kabushiki Kaisha, Tokyo, Japan

[21] Appl. No.: 171,165

[22] Filed: Jul. 22, 1980

[30] Foreign Application Priority Data

Jul. 24, 1979 [JP] Japan ................................. 54-94106

[51] Int. Cl.³ ...................... G01S 13/00; G08B 23/00; G08G 1/00
[52] U.S. Cl. ............................ 343/7 VM; 340/815.24; 340/33; 343/112 CA
[58] Field of Search ............ 343/7 VC, 7 VM, 5 PD, 343/112 CA; 340/24, 32, 33, 286 M, 366 D, 373; 356/4

[56] References Cited

U.S. PATENT DOCUMENTS 3,892,483 7/1975 Stauffer ........................ 343/112 CA
4,028,662 6/1977 Young ............................. 343/7 VM
4,195,425 4/1980 Leitz et al. ............................. 356/4

Primary Examiner—S. C. Buczinski
Attorney, Agent, or Firm—Irving M. Weiner; Pamela S. Burt; John L. Shortley

[57] ABSTRACT

An automotive radar monitor system for monitoring an object or objects running in the front and/or in the rear, left and/or right with respect to the vehicle equipped with the system. The radar monitor system is specifically designed to provide a driver with an indication of the state of an approaching object or objects in the traffic at any given moment by way of an integrally simulated pattern which can be recognized at a glance, together with an audible indication.

4 Claims, 8 Drawing Figures

AUTOMOTIVE RADAR MONITOR SYSTEM

FIELD OF THE INVENTION

The present invention relates to a radar system indication device, and more particularly to a radar system display for use in a self-propelled craft such as an automotive vehicle which is specifically designed to audibly or visually alert the driver of an automotive vehicle of a condition wherein there is a possibility of collision or contact with an object or objects approaching or interfering with the path of travel of the aforesaid vehicle, in accordance with the vehicle interval distance and relative velocity with the object or objects in the traffic at any given moment.

BACKGROUND OF THE INVENTION

There have been developed an ever-increasing number of safety devices for the purposes of protecting the lives of drivers and passengers of automotive vehicles by the provision of incessant monitoring, using electronic devices such as a radar system in both the forward and rearward directions of the vehicle for determining a vehicle interval distance and/or relative velocity. Such systems warn the driver when the vehicle is entering a risky area of possible collision or contact with another vehicle in front, or provides the driver with information on the state of an object approaching in the rear, such as when the driver wishes to change lanes.

As typically shown in FIG. 1, the general construction of this type of radar system to be provided on an automotive vehicle is such that there is provided a front monitor section adapted to generally monitor and detect another vehicle or an object B travelling in the same lane in front of the vehicle A in question, and a rear monitor section adapted to observe other vehicles or objects C and D travelling behind vehicle A on both adjacent lanes, the former being essentially required to have a monitoring range of approximately 100 meters in the front of the vehicle A, while the latter has a monitoring range of approximately 50 meters in the rear thereof. The front monitor system of this application is designed to detect a vehicle interval distance and relative velocity with respect to the object B in the front, from the detected data obtain an appropriate or safe interval distance required at the vehicle A's travelling speed at that given moment, and then compare this interval distance with an actual interval with the object B at the given moment. When such actual interval is found to be shorter than the required safety interval, a warning is presented to the driver of the vehicle A from time to time in accordance with the extent to which the actual interval is shorter than the safe vehicle interval. The rear monitor system is designed to detect interval distances and approaching velocities of the objects C and D in blind spot locations which may be partially out of view to the driver on the adjacent lanes as typically shown in FIG. 1, and indicate information on the approaching objects C and D to the driver so that he may properly judge when to change lanes, for instance, for the purpose of passing or the like. In this connection, it is essential to provide an appropriate indication of information relating to the vehicle interval and the attitude of approach so that the driver of the vehicle A can instantly determine what action to take in meeting the situation around his vehicle.

SUMMARY OF THE INVENTION

In consideration of requirements essential to a radar system indication device for use in an automotive vehicle, the present invention is directed to the provision of such a device which provides a constant indication for warning the driver of a vehicle as to a vehicle interval distance and attitude of approach of objects in the front and/or in the rear of such vehicle in accordance with detection at a given instant of the vehicle interval and relative velocity provided by the front and rear monitor radar systems.

According to the present invention, there is provided an improved radar system display device for use in an automotive vehicle which comprises, in combination, front monitor radar means adapted to detect a vehicle interval and relative velocity with an object in the front at a given moment, rear-left and rear-right monitor radar means adapted to detect a vehicle interval or intervals at a given moment with an object in the front, or an object or objects in the rear, left and/or right with respect to the vehicle in question, respectively. Channel switching means are provided to process detection signals from the front and rear radar means in a time-division manner, and signal processing circuit means are provided to obtain an appropriate vehicle interval at a given moment in terms of the speed of travel and relative velocity of the vehicle in question at that moment with the front object so as to compare the appropriate vehicle interval with an actual vehicle interval with the object at that moment, thereby to output a warning signal relating to the vehicle interval, and also adapted to provide signals indicating the attitude of approach of an object or objects in the rear left and/or right at a given moment. Display means are provided to indicate a warning in an integrally simulated fashion of a vehicle interval with the front object and of a state of approach of a rear object or objects with respect to the vehicle in question at a given moment.

Further objects and advantages of the present invention will become apparent from the following detailed description taken in conjunction with the accompanying drawings, in which like parts are designated with like reference numerals.

DETAILED DESCRIPTION OF THE PREFERRED EMBODIMENT

Figure 2:
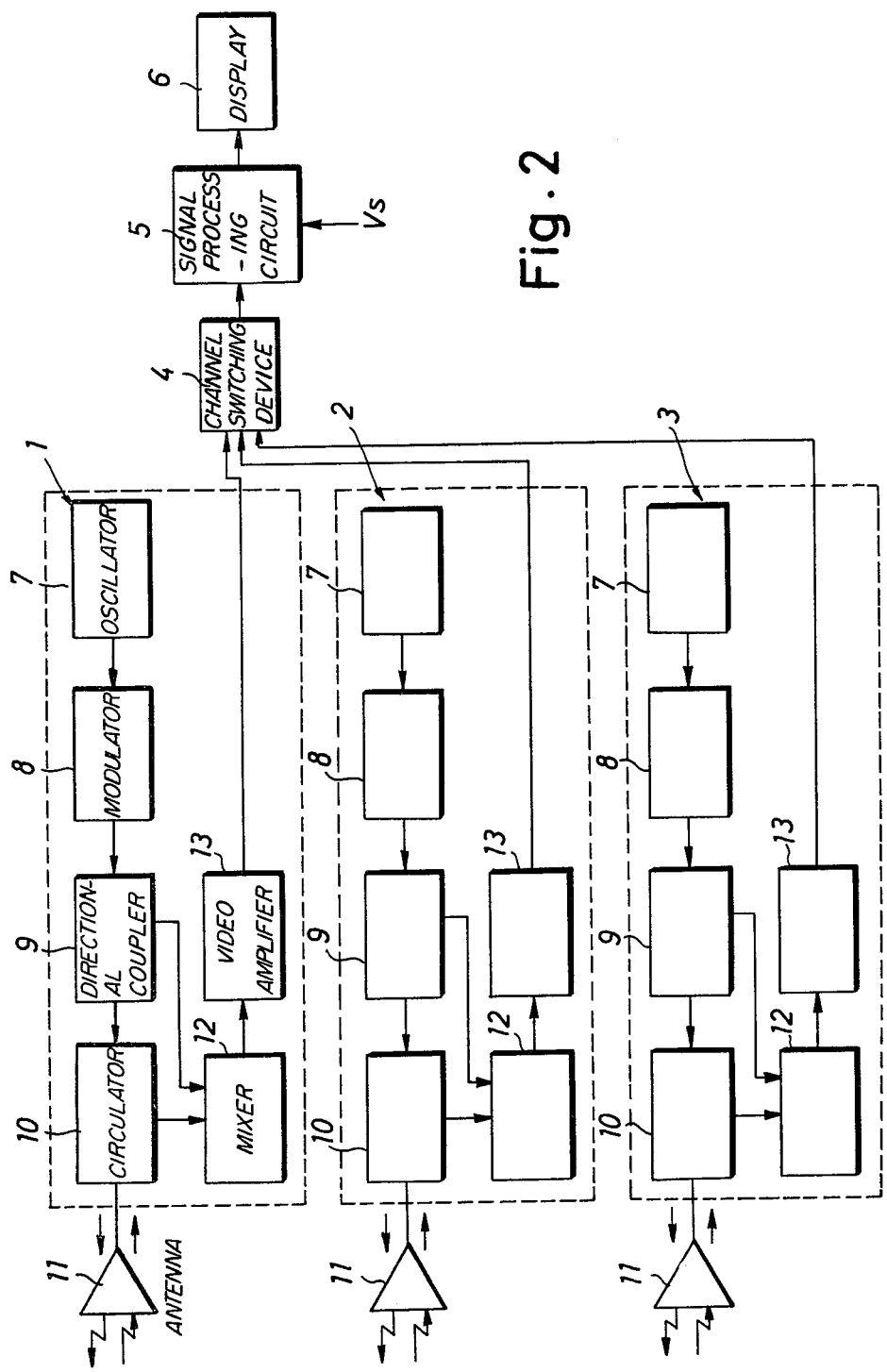
FIG. 2 is a block diagram showing the general construction of a radar system for use in an automotive vehicle by way of a preferred embodiment of the present invention.

With reference to FIG. 2, there is shown a block diagram of the radar system for use in automotive vehicles which comprises a front monitor radar section including an emitter and a receiver 1, a rear-left monitor radar emitting/receiving section 2, a rear-right monitor radar emitting/receiving section 3, a channel switching device 4 for shifting and reading sequentially detection outputs from the above-mentioned radar sections, and processing signals from the above mentioned radar sections in time series fashion, a signal processing circuit (CPU) 5 adapted to arithmetically operate as desired on the detection outputs from each radar section and a velocity signal from a speedometer of a vehicle, etc., and an indicator or display 6 for presenting a warning on a vehicle interval distance to a front object and for indicating an attitude of approach of an object or objects in the rear with respect to the vehicle in question.

In general, with respect to the types of radar systems for emitting and receiving radio waves applicable to each of the radar sections 1 through 3 mentioned above, there have commonly been used: the Doppler radar system adapted for determining a distance to and a relative velocity with an object from a so-called Doppler frequency shift to be produced by a relative velocity of an emitted beam of radio wave and reflected-to-return waves; the pulse radar for determining a distance to and a relative velocity with an object by measuring a return or turnaround propagation time of the emitted and received waves; and the FM-CW type radar system for determining a distance to an object from beat frequencies produced from a possible phase shift in the emitted and received waves. According to the types of radar systems employed, the arithmetic operation required in the signal processing circuit 5 varies with the contents of detection. FIG. 2 shows, as an example of such radar systems, the general construction of the FM-CW type radar system comprising the monitor radar emitting and receiving sections 1 through 3, wherein a transmitting signal generated from an oscillator 7 is modulated at a given frequency by a modulator 8 in each of the monitor radar sections, each thus-modulated signal is then emitted in the form of a radio wave beam from an antenna 11 after passing through a directional coupler 9 and a circulator 10, reflected-to-return waves from an object are delivered through the circulator 10 to a mixer 12, where there is produced beat frequencies with the reflected waves and the transmitting wave fed from the directional coupler 9 so as to produce beat frequency signals, and wherein the thus-obtained beat frequency signals are then amplified to a desired level with a video amplifier 13, thus presenting desired radar detection outputs. Since the beat frequencies to be obtained at each of the radar sections are known to be proportional to the distance at that moment to the object to be detected, it is possible to immediately determine the desired vehicle interval distance from such radar detection outputs, and hence the relative velocities may also be obtained by way of the calculation of a change of such distance with the lapse of time.

Figure 1:
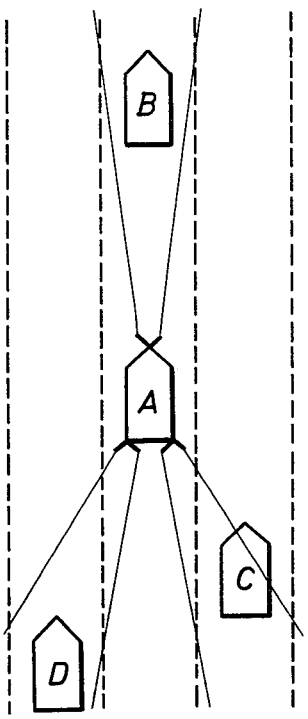
FIG. 1 is a schematic diagram showing the state of detection by the front and rear monitoring radar systems of general arrangement with respect to one object in the front and two others in the rear of a vehicle in question.
Figure 3:
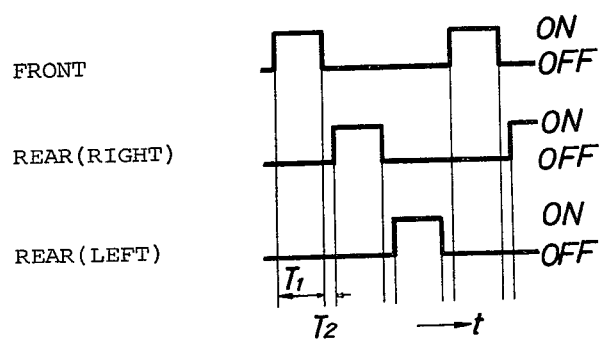
FIG. 3 is a timing chart showing the state of operation of channel switches employed in the embodiment shown in FIG. 2.

In the FM-CW type radar system for use in an automotive vehicle to be employed in the present invention, the detection output from each of the radar sections 1 through 3 above is fed to the channel switch 4, respectively, where such detection signal from these three sections is processed on the time division basis as typically shown in FIG. 3, and thereafter the thus-obtained time-series signals are transmitted to the signal processing circuit 5. In this signal processing circuit 5, an individual signal processing is performed as desired within a determined time interval $T_1$ per one time series as determined by the time division processing (see FIG. 3), respectively, thus providing a warning signal relating to a interval distance with a front object at the given moment and an indication or indications of an object or objects in the rear to the indicator or display 6. At this moment, the signal processing circuit 5 operates arithmetically to obtain the interval distance to, and relative velocity Vr with, the front object from the detection output from the radar section 1, and then attain an appropriate or safe vehicle interval distance in accordance with a required content having appropriate vehicle interval values previously stored in light of the values of Vs and Vr (the vehicle's speed value Vs at the given moment being taken from the speedometer or the like). The thus-obtained safe vehicle interval distance is then compared with the actual vehicle interval with the object at the given moment, thus providing a desired warning signal in view of the value derived by comparison or subtraction therebetween, accordingly. At the same time, the signal processing circuit 5 operates likewise to provide a desired signal or signals relating to an approaching object or objects in the rear left or right to the display 6, if any, according to each of the detection outputs from the radar sections 2 and 3, respectively, delivered in succession. More specifically, such indications provided by the rear monitor radar sections 2 and 3 are not designed for advising the driver of the vehicle of an extent of risk in the rear area, but for giving an objective indication to the driver for assisting him in determining the extent of danger involved when he desires to change lanes, as necessary. In FIG. 3, $T_2$ indicates a pause time interval between channels.

According to the present invention, there is provided a specific display 6 for use in the radar system for an automotive vehicle, which is characterized in that the warning indication of a vehicle interval with the front object at a given moment and the provision of information relating to the state of approaching objects in the rear may be employed in an optimum manner. More specifically, the characteristics of the indication are such that the locations of objects in the front and rear of one's own vehicle are simulated by way of an integral visual representation so that the driver of the vehicle can immediately determine the extent of risk of possible collision or contact with the front object as well as the extent of approach of the rear object or objects at a given moment, whereby the driver can readily maintain vehicle operation in an assured and safe manner in the traffic in compliance with the indication of the display, accordingly.

Figure 4:
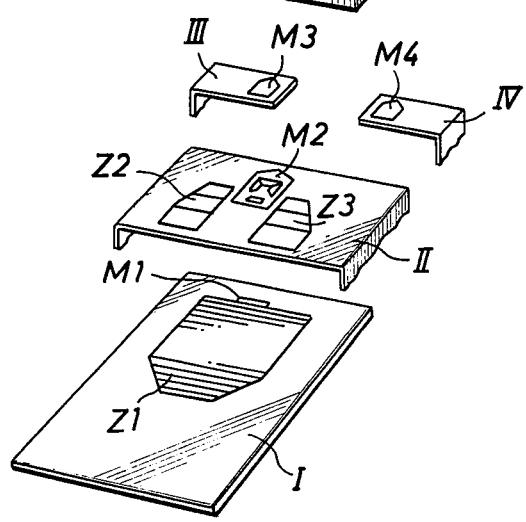
FIG. 4 is a top plan view showing a preferred embodiment of the indicator or display for use in the embodiment shown in FIG. 2.
Figure 4:
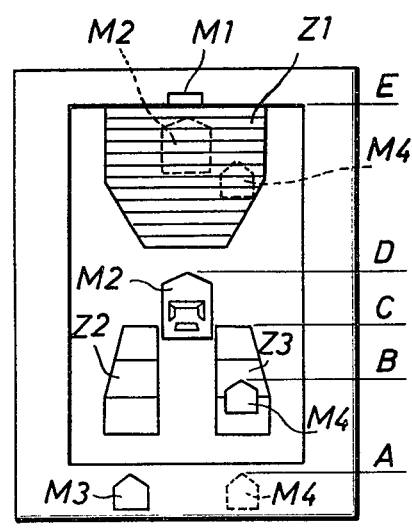

Referring next to FIG. 4, there is shown an example of the display 6 employed in the present invention, which is constructed to physically display in such a manner that there is provided a variety of markers which are mechanically driven by power or by electric motors over a graphic panel designed to visually indicate a range of areas extending in the front and rear of the vehicle in question in accordance with each of the outputs from the signal processing circuit 5 mentioned above.

Figure 5:
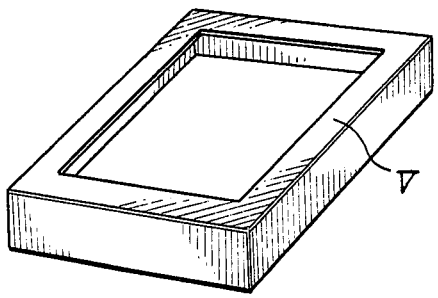
FIG. 5 is an exploded perspective view showing the display shown in FIG. 4.

More specifically, in FIG. 4, as shown there is provided a front object marker $M_1$ and a front area indication zone $Z_1$ divided by a plurality of lines formed by a plurality of unit LED's, both of which are disposed in coplanar relationship on a plate I as shown in FIG. 5. On the other hand, there is also provided a marker $M_2$ indicating the vehicle in question, and rear-left and rear-right area indication zones with visual patterns $Z_2$ and $Z_3$, respectively, all of which are disposed in coplanar relationship with each other, such as shown on plate II in FIG. 5, and installed in such a manner that the plate II may slide on and along the plate I. As described hereinabove, because the rear-left and rear-right area indication zones $Z_2$ and $Z_3$ are designed merely to provide the driver with an objective indication which he may observe as necessary, they are not divided with such fine lines as in the front indication zone $Z_1$ for a quick determination of the extent of approach of the object, but instead are divided roughly into approximately three stages or ranks. Also, there are provided markers $M_3$ and $M_4$ for indicating rear-left and rear-right objects, respectively, which are separately provided on different small plates designated at III and IV in FIG. 5, respectively. These small plates III and IV are respectively mounted on the above mentioned plate II in the rear-left and rear-right area indication zones $Z_2$ and $Z_3$ thereof in such a manner that they can slide therealong. The indication part of the display 6 is assembled with the plates I and II and the small plates III and IV installed in combination, respectively, and thereafter these components are housed within an outer casing V.

Figure 6:
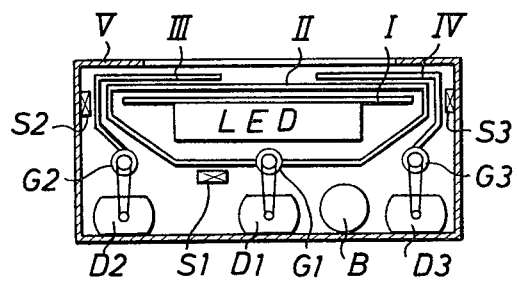
FIG. 6 is a front elevational view in cross-section showing the display shown in FIG. 4.

Referring to FIG. 6, there is shown drives for the display 6. The drives comprise an electric motor $D_1$ for driving the plate II by way of a worm element $G_1$ and a driving belt, electric motors $D_2$ and $D_3$ for likewise driving the small plates III and IV by way of worms $G_2$ and $G_3$ and driving belts, respectively, and cursors or locating sensors $S_1$, $S_2$ and $S_3$ adapted to detect each position of the plates II and the small plates III and IV and feed the thus-produced detection signals back to the signal processing circuit 5. Also, there is provided a buzzer B which is designed for audibly warning the driver in an intermittent or continuous manner of a possible collision or contact with the front object.

The following detailed description relates to the operation of the display 6 constructed as explained hereinabove.

Firstly, warning operation of display 6 for indicating a vehicle interval distance is as follows. Assuming the front monitor radar section 1 has a maximum detection capability of 100 meters in the front area of the vehicle, for example, the front indication zone $Z_1$ of the display 6 is provided with 20 LED lines with one line corresponding to a distance of 5 meters and thus covering the desired detection range of 100 meters in total. When there is an object travelling at a distance more than 100 meters in front of the vehicle in question travelling at a certain speed, the marker $M_2$ indicating the vehicle in question is positioned stationarily out of the front indication zone $Z_1$. At the same time, a plurality of LED lines are lit corresponding to a safe vehicle interval at the given moment as determined by the signal processing circuit 5 according to the speed of vehicle in question at that moment with respect to a location E of the front object marker $M_1$ as a reference point. If this safety interval is 50 meters, for example, 10 LED lines are lit, which means 50 meters. If the vehicle in question is travelling at a greater distance than the desired safety interval, these LED's may be lit with a first or lowest grade of illumination so predetermined. Next, when the interval is smaller than 100 meters yet still greater than the desired safety interval, the marker $M_2$ (or the plate II) moves to a point at the lit LED lines which corresponds to the actual interval with the object at that moment. Under such condition, the degree of illumination, which correspond in lit LED lines of the number to the desired safety interval, is at the first grade as mentioned in the former case. When the actual vehicle interval at any moment becomes shorter to be within the range of the safety interval, there is provided an intermittent warning by the buzzer B, and the degree of illumination of the lit LED lines increases up to a second grade. At this moment, the marker $M_2$ now moves to a point of the lit LED lines which corresponds to the actual vehicle interval.

If the vehicle in question comes nearer to a marginal safety interval in which there is no longer any assurance of safety, the buzzer B works continuously to warn the driver of an emergency, and concurrently, the intensity of illumination of the lit LED's will now increase to a third grade which is the strongest, while the marker $M_2$ moves to a point of the LED's indicating the actual vehicle interval at the moment. The controls of lighting and luminance of each LED line may be conducted by the signal processing circuit 5.

Next, description will now be made with reference to an object or objects which may be present in the rear zones of the present vehicle. The rear monitor radar sections 2 and 3 may be assumed to have a maximum range of detection of 50 meters in the back of the vehicle in question, hence having a maximum range of indication of 50 meters, accordingly. When the driver of the vehicle in question turns the right turn signal blinker on when changing lanes, for instance, there is provided a rear-right monitor command to the signal processing circuit 5. Upon this command, a signal indicating a vehicle interval with an object or objects in the rear areas at that moment, as detected by the rear-right monitor radar section 3, is now fed to the driving motor $D_3$ in the display 6. Accordingly, the marker $M_4$ for the rear-right indication zone $Z_3$ is moved so as to correspond to the actual interval with the rear object at that moment (see FIG. 4). At this moment, while the rear-right object is still approaching nearer toward the vehicle in question while the blinker is working, the rear-right object marker $M_4$ is caused to move along the rear-right indication zone $Z_3$, accordingly. While the rear-right indication zone $Z_3$ also moves together with the vehicle marker $M_2$ during the indication of this vehicle interval (as a maximum, it moves toward the point E in FIG. 4), it is arranged such that the motion indication on the rear-right indication zone $Z_3$ is now superposed upon the driving motor $D_3$ for the rear-right object marker $M_4$, whereupon there is always indicated the proper attitude of approach of the rear object on the rear-right indication zone $Z_3$, irrespective of the location of the zone. On the other hand, in the case that a rear-right monitoring command is provided, the marker $M_4$ indicating the rear-right object rests motionless in the position A shown in FIG. 4. It should be noted that the above-described operation takes place in a like manner when the driver turns the left blinker on so that the rear-left marker $M_3$ is now positioned on the rear-left indication zone $Z_2$ indicating the state of approach of a rear-left object in the traffic.

Figure 7:
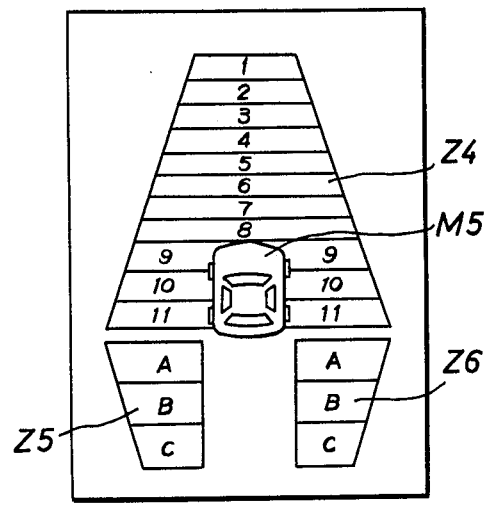
FIGS. 7 and 8 are plan views showing other embodiments of the invention, respectively.
Figure 8:
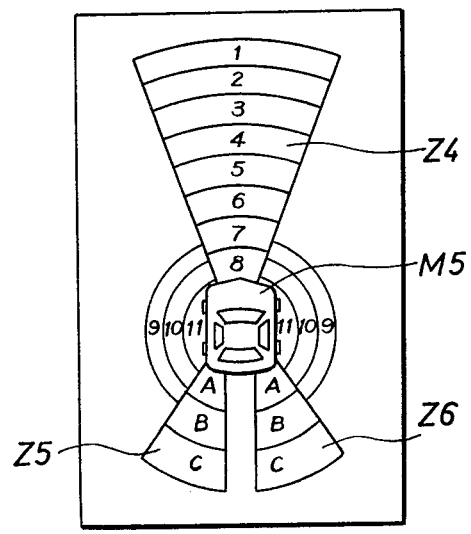

Referring to FIGS. 7 and 8, there are shown other embodiments of the display 6, respectively. In such variations, the display 6 comprises a marker $M_5$ indicating a vehicle in question, a front risk degree indication zone $Z_4$ adapted to directly indicate in gradually stepped levels the degree or possibility of contact risk with a front object by illuminating in a rank-by-rank manner a plurality of LED lines, i.e., a plurality of LED's arranged in the form of lines (in FIGS. 7 and 8, there are shown examples presenting a degree of contact risk in eleven ranks), and rear-left and rear-right approaching degree indication zones $Z_5$ and $Z_6$ adapted to indicate a degree of approach of an object or objects in the rear left and/or in the rear right by illuminating in a rank-by-rank manner a plurality of LED lines (in these figures, there are shown examples incorporating grades of approach A, B and C).

According to such configurations of the display 6 for a front monitoring procedure, the number of LED lines illuminated corresponds to an interval with a front object at that moment detected in terms of the above mentioned eleven grades of vehicle interval or contact risk which are previously stored in the signal processing circuit 5 as functions of a vehicle's speed Vs and relative velocity Vr at that moment. More particularly, when there is a front object travelling within the detection range (i.e., 100 meters) of the front monitor radar section 1 of the vehicle in question, and if it is in the least grade of contact risk, only a first rank of LED lines is lit in the front risk degree indication zone $Z_4$. When such object is in a second grade of risk, the first rank and a second rank of LED lines are lit. In this manner, there are lit a number of LED lines corresponding to the extent or grade of risk at a given moment, up to the highest grade of risk having the eleven ranks of LED lines. In the embodiment illustrated, it is intended that the eighth rank of LED line represents an appropriate vehicle interval at a given moment, and nine to eleven ranks of LED lines represent a risk range of possible contact so specified. In this connection, the intensity of illumination or luminance of the LED lines up to the eighth rank is set to be less than that of the nine to eleven ranks of LED lines. Also, at the moment that there is a shift in lighting from the eighth rank of LED lines over to the risky range covered by the ninth rank and upwards, the buzzer will also work for a short period, for the purpose of drawing the driver's attention. Also, if there arises a higher risk of possible contact with the front object reaching the level of the tenth rank of LED line indication, the tenth rank of LED line is lit in a flickering manner, and when the highest grade of risk in terms of the eleventh rank of LED line is reached, both the tenth and eleventh ranks of LED lines are lit in a flickering manner and the buzzer works continuously. The above described combination of risk representation is merely exemplary of how the driver may be immediately warned of a potential risk at a given moment in accordance with a grade of risks.

Next, a rear monitoring procedure is activated by the left or right blinker being selectively operated by the driver. The rear-left and/or rear-right monitor radar sections 2 and/or 3 having the monitoring range of approximately 50 meters will operate, when so actuated, to produce working signals in such a manner that when there is detected an object in the rear left or right area within the above mentioned monitoring range, the LED lines in the approaching degree indication zones $Z_5$ and $Z_6$ are lit starting with the zone C to the zone B, then to the zone A in accordance with the degree of approach at that moment by the object under detection.

As fully described hereinabove, according to the radar monitoring system for use in the automotive vehicle of the present invention, there are provided the front monitor radar section and the rear-left and rear-right monitor radar sections, respectively, which operate as necessary to obtain the state of vehicle interval or the attitude of approach at a given moment in both the front and rear areas of the vehicle in question by processing the detection signals from these individual radar sections, respectively, and there is provided an efficient display which presents the driver with integrally simulated patterns of information as to the objects in both the front and rear areas in accordance with the resultant signals from the monitoring radar systems. With such simulated patterns of indication by way of the display according to the present invention, the driver can immediately grasp the travelling conditions at a given moment either visually or audibly. Moreover, the display of the present invention may efficiently advise the driver of an appropriate vehicle interval with an object to be observed and with appropriate instructions by warning of possible contact or a predicted degree of safety relating to a desired change of lanes, etc.

What is claimed is:

1. An automotive radar monitor system which comprises, in combination:
    front monitor radar means for detecting a vehicle interval and relative velocity with an object in the front at any given moment;
    rear-left and rear-right monitor radar means for detecting a vehicle interval or intervals at any given moment with an object in the front, or an object or objects in the rear, left and/or right with respect to a vehicle in question provided with said system, respectively;
    channel switching means for processing detection signals from said front and rear radar means in a time-division manner;
    signal processing circuit means for obtaining an appropriate vehicle interval at a given moment in terms of the travelling speed of said vehicle and relative velocity with said front object at that moment so as to compare said appropriate vehicle interval with an actual vehicle interval with said object at that moment, thereby to output a warning signal relating to said vehicle interval, and for providing signals indicating an attitude of approach of an object or objects in the rear left and/or right at any given moment; and
    display means for indicating a warning in an integrally simulated fashion as to a vehicle interval with said front object at any given moment and as to the state of approach of a rear object or objects with respect to said vehicle in question at any given moment.

2. An automotive radar monitor system according to claim 1 wherein:
    said display means comprises a stationary plate member having a front area indication zone including a plurality of light emitting lines disposed at equal fractional intervals for indicating a vehicle interval at any given moment, a first movable plate member including a marker representing said vehicle in question and area indication zones for indicating a rear-left area and a rear-right area, respectively, and adapted to move slidably on and along said first stationary plate member, second and third movable plate members including a rear-left object marker and a rear-right object marker, respectively, and adapted to move slidably with respect to said first movable plate member, and a motor drive adapted to slidably move each of said movable plate members according to the outputs from said signal processing circuit means, said members operatively cooperating such that said vehicle marker may be positioned shiftably with respect to said front area indication zone and said rear-left object marker and said rear-right object marker are positioned likewise shiftably with respect to said rear-left and rear-right area indication zones, respectively, in accordance with said outputs from said signal processing circuit means, and concurrently such that each of said plurality of light emitting lines may be controlled in accordance with said outputs from said signal processing circuit means, whereby the relationship of said vehicle in question with said front and/or rear object or objects can be indicated accordingly to the driver of said vehicle in question.

3. An automotive radar monitor system according to claim 1 wherein:

each display means comprises a front area risk grade indication zone including a plurality of light-emitting lines adapted to indicate rank-by-rank a grade of possible contact in terms of a vehicle interval at any given moment with an object in the front area of said vehicle in question, and rear-left and rear-right approaching grade indication zones including a plurality of light-emitting lines adapted to indicate rank-by-rank a grade or extent of approach of an object or objects in the rear, left and/or right areas of said vehicle in question, and wherein each of said light-emitting lines in said front area indication zones is controlled with respect to the intensity of light emitted therefrom in accordance with the grade of contact risk so that the driver of said vehicle may visually acknowledge the relationship of said vehicle with said front object.

4. An automotive radar monitor system according to claim 2 or 3 wherein:

said display means further comprises buzzer means adapted to work at a moment when said vehicle in question enters into a range of relatively short vehicle interval distances where a probability of collision or contact with said object in the front area thereof would become substantially high.

* * * * *